April 5, 1960 J. R. ROOT 2,931,441
JET-DRIVEN HELICOPTER ROTOR
Filed Sept. 19, 1956 2 Sheets-Sheet 1

INVENTOR
JAMES R. ROOT
BY Ralph T. French
ATTORNEY

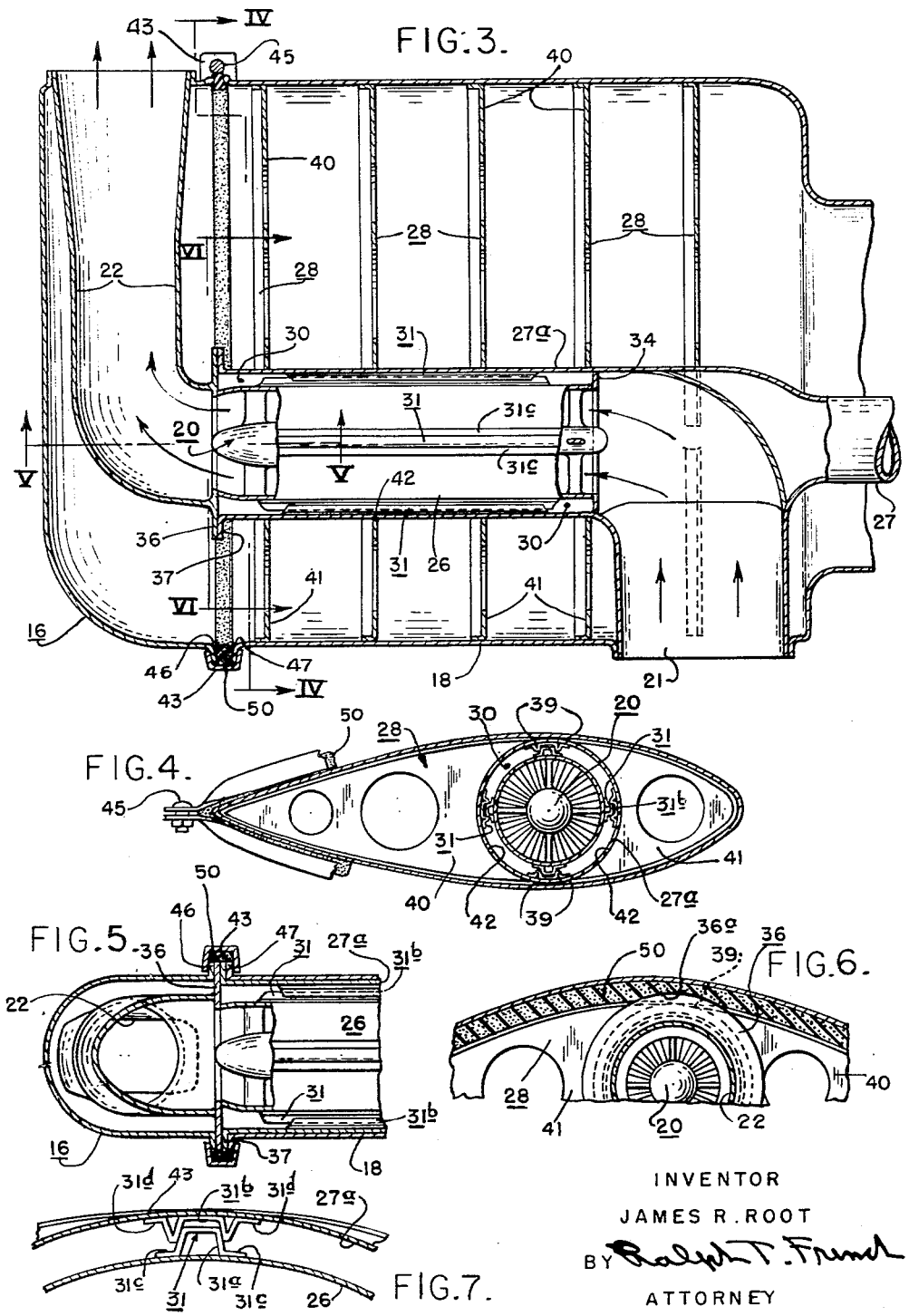

United States Patent Office 2,931,441
Patented Apr. 5, 1960

2,931,441

JET-DRIVEN HELICOPTER ROTOR

James R. Root, Independence, Mo., assignor to Westinghouse Electric Corporation, East Pittsburgh, Pa., a corporation of Pennsylvania Application September 19, 1956, Serial No. 610,826

5 Claims. (Cl. 170—135.4)

This invention relates to jet propelled helicopter rotors and more particularly to a mounting arrangement for the jet engine thereof.

When the jet engine is mounted near the tip portion of the rotor with longitudinal axis of the engine parallel to that of the rotor, unique forces and stresses arise which present unusual problems in the mounting of the engine. The engine mounting means must be strong enough to resist these stresses and forces and yet should be such that the airfoil thickness, that is, the cross sectional area of the rotor taken on a plane transverse to the longitudinal axis where the engine is located, may be constructed of minimum thickness. Therefore, it is an object of this invention to provide a jet engine mounting means which may be mounted in a rotor having an airfoil of minimum thickness, will be simple in construction, and be strong enough to withstand the forces to which it will be subjected.

It is another object of this invention to provide an engine mounting means which will facilitate removal of the engine.

A further object of this invention is to provide an engine mounting means having large bearing surfaces so as to distribute the forces tending to distort the engine or impair its operation.

One embodiment of the present invention comprises a rotor arm having a body portion and a detachable tip portion. The body portion is provided with a longitudinally extending tubular spar which at the end nearest the tip is provided with an enlarged portion forming a housing for the jet producing means. The tubular spar also defines the thickest part of the cross-sectional area of the airfoil except for the cover. A plurality of runners are provided between the jet producing means and the housing so that upon removal of the tip the jet engine may be slidably removed from the housing.

These and other objects are effected by the invention as will be apparent from the following description and claims taken in connection with the accompanying drawings, forming a part of this application, in which:

Fig. 3 is a horizontal axial sectional view of the portion of the rotor illustrated in Fig. 2;

Fig. 4 is a transverse sectional view taken along the line IV—IV of Fig. 3 looking in the direction indicated by the arrows;

Fig. 5 is a partial vertical axial sectional view taken along the line V—V of Fig. 3 looking in the direction indicated by arrows;

Fig. 6 is a partial transverse sectional view taken along the line VI—VI of Fig. 3 looking in the direction indicated by the arrows; and Fig. 7 is an enlarged cross sectional view of the runners shown in Fig. 4.

Figure 1:
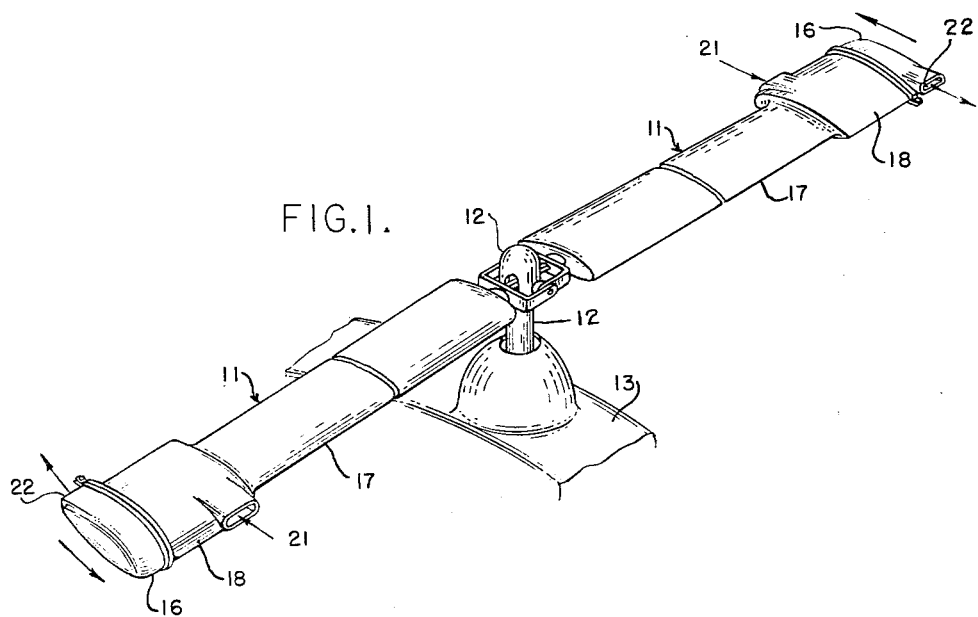
Fig. 1 is a perspective view showing a helicopter rotor embodying the present invention in operating position and omitting the major portion of the fuselage of the helicopter.

Referring to the drawings, and particularly to Fig. 1, there is illustrated a typical helicopter rotor assembly employing jet producing means as the source of motive power. The rotor assembly comprises a plurality of rotor arms or wings 11 rotating in a counterclockwise direction, as viewed in Fig. 1, connected to a central and vertically extending shaft 12 which extends into a fuselage 13, only a portion of the latter being shown. Each rotor arm 11 comprises a detachable cap or outer tip portion 16 and a main body portion 17. The body portion 17 is provided with an enlarged end portion 18 at the end farthest removed from the shaft 12. The enlarged portion 18 encloses a jet producing means as hereinafter described and is also provided with an air inlet conduit 21. The tip or cap portion 16 encloses a jet exhaust or outlet conduit 22.

Figure 2:
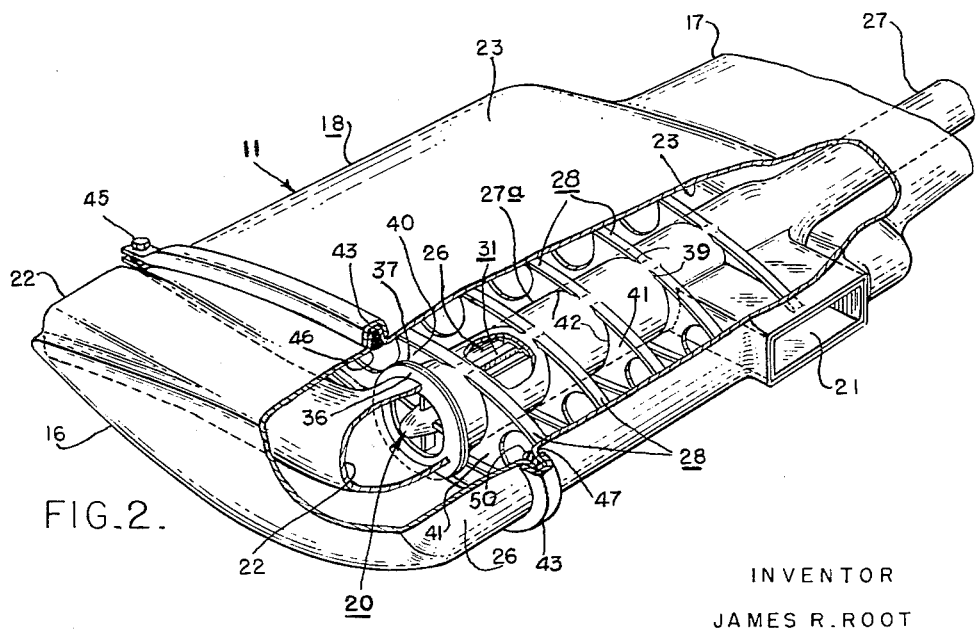
Fig. 2 is an enlarged perspective view of the outer portion of a rotor arm shown in Fig. 1 with a portion of the cover removed to show the jet engine mounting means.

Referring to Fig. 2, a portion of a surface cover 23 has been cut away to show the outlet conduit 22 and the structural members forming a framework comprising a longitudinally-extending tubular spar member 27 and a plurality of transverse ribs 28. The tubular spar member 27 extends longitudinally approximately the entire length of the body portion 17 and forms the main structural member of each rotor arm. At the end of the body portion 17 adjacent the tip 16, the tubular spar is provided with an enlarged portion or housing 27a. The longitudinal axis of the tubular spar 27 extends parallel to, and the transverse ribs 28 extend approximately at right angles to, the longitudinal axis of the rotor. A portion of the housing 27a has also been cut away to show a portion of the tubular casing 26 enclosing a jet producing means or jet engine 20. The casing 26 is disposed within but spaced from the housing 27a.

Referring to Figs. 3 and 4, the ribs 28 substantially define the airfoil shape of each rotor arm and are divided into a plurality of segments, 40 and 41, respectively, each provided with a semi-circular opening 42 intended to embrace the tubular spar 27, including the enlarged portion 27a, so that the outer edges of the transverse ribs 28 approach the tubular spar approximately tangentially as at 39. The tubular spar and the segments 40 and 41 are so disposed relative to each other that the thickest part of the airfoil shape is defined by the tubular spar. By constructing the transverse ribs 28 in the foregoing manner, the cross-sectional thickness of the rotor may be maintained to the minimum required by the housing for enclosing the jet engine.

The transverse ribs are rigidly secured to the tubular spar 27 by suitable means, such as welding, so that the housing and transverse ribs become a structural unit of each rotor arm. The housing 27a is provided with a radially inwardly-projecting collar 34 rigidly secured thereto at the inlet end, the right-hand end as viewed in Fig. 3. Disposed within but spaced from the tubular spar or housing 27 so as to form therewith an annular chamber 30 is the casing 26. The casing 26 abuts the collar 34 and encloses the jet producing means 20, a portion of which is shown in Fig. 3 where the casing has been cut away.

Pairs of runners 31 are disposed within the chamber 30. In the preferred embodiment, four pairs of runners 31 are shown disposed equidistant from one another and extending substantially the entire axial length of the casing and the housing. The number of pairs of runners may vary and they may be divided into segments along the axial length if preferred.

Referring to Fig. 7, there is shown in enlarged cross-section a pair of runners comprising a male member 31a secured to the outer surface of the casing 26 and a female member 31b secured to the inner surface of the housing 27a. The male member 31a may be an extruded member and the major portion is constructed of a substantially U shape in cross-section. The sides of the U terminate in circumferentially-extending feet portions 31c which are rigidly secured by welding or other means to the outer surface of the casing 26. Similarly, the female member 31b may be an extruded member and the major portion is constructed with a mating U shape in cross-section having the base of the U substantially circumferentially extending so that it may be welded or otherwise rigidly secured to the inside surface of the housing 27a. Each side of the U of the female member is provided with an extended portion which is turned back towards the housing so as to form a V shape in cross-section and the end portions of these turned-back sides terminate in feet portions 31d which are also rigidly secured to the inside surface of the housing 27a. The V shape is added to each side of the U of the female member to increase the rigidity of the mounting means so that it may better withstand the large torsional forces exerted by the engine.

The sides of the U are constructed relatively straight on both female and male members, but they are inclined so that the sides of the U shape of both the male and the female member converge outwardly. The male and female members are constructed so as to mate when the casing is in proper working position by having the sides of one overlap the sides of the other. By making this overlapping area of substantial size the forces tending to distort and impair the engine mounting are distributed over a large area and the unit loading may be controlled within allowable limits.

Referring to Figs. 3 and 5, at the exhaust end of the jet engine, the left-hand end as viewed in Fig. 3, the casing 26 abuts a radially outwardly-extending flange 36 which is integral with the outlet conduit 22, minimizing the leakage of exhaust gases into chamber 30. The housing 27a is provided with a radially outwardly-extending collar 37 which also abuts the flange 36 of the outlet conduit. In the preferred embodiment, the housing 27a, and the casing 26 abut the flange 36 in the same plane.

Referring to Fig. 5, the flange 36 is extended radially outwardly and rigidly secured by suitable means, such as welding, to a deformed cover-edge 46 of the tip 16 turned at an angle of approximately ninety degrees to the plane of the rotor covering. Likewise, the collar 37 is extended radially outwardly and is rigidly secured by suitable means, such as welding, to a deformed cover-edge 47 of the rotor arm end portion 18 turned at an angle of approximately ninety degrees to the plane of the covering.

As illustrated by Figs. 4, 5 and 6, the tip 16 is rigidly connected to the enlarged end portion 18 which encloses the jet engine by a C clamp comprising a strap 43 of substantially U shape in cross-section extending transversely of the longitudinal axis of the rotor and a nut and bolt connection 45 which secures the ends of the strap 43 at the trailing edge of the rotor arm. The strap 43 fits over and engages the outer sides of the deformed edges 46 and 47 and is constructed so as to urge the edge 46 and flange 36 towards the edge 47 and collar 37.

As shown by Fig. 6, the flange 36 extends between the edges 46 and 47 for only a portion of the transverse distance of the joint between the tip 16 and the end portion 18. The collar 37 is similarly disposed but is not shown. A packing strip 50, as shown in Fig. 3, is disposed between the edges 46 and 47 throughout the major portion of the joint. However, in the vicinity of the flange 36 and the collar 37, the packing strip 50 is placed between the strap 43 and a portion 36a of the outer cylindrical surface of the flange 36 which lies between the edges 46 and 47.

From the foregoing it is seen that by removing the strap 43, the tip portion 16 is detachable from the body portion 17. The jet engine may then be removed by sliding the casing 26 relative to the housing 27a on the runners 31.

While the invention has been shown in but one form, it will be obvious to those skilled in the art that it is not so limited, but is susceptible of various changes and modifications without departing from the spirit thereof.

What is claimed is:

1. In combination, a longitudinally extending rotor arm, said rotor arm being divided into a body portion and a detachable tip portion, said body portion including a longitudinally extending spar fixedly positioned therewithin, said spar having a tubular end portion forming a housing adjacent said tip portion, and an engine disposed within said housing, whereby upon detachment of said tip portion access is had to said engine and said housing.

2. In a longitudinally extending wing having an airfoil shape in cross section, the combination of structural members forming a framework for said wing comprising ribs extending transversely to the longitudinal axis of said wing, a tubular housing fixedly secured to said ribs, and an engine disposed within said housing, said engine and said housing including cooperating support members for slidable movement of said engine relative to said housing, whereby said engine may be positioned relative to said housing, each of said ribs being divided into two segments approximately defining said airfoil shape, said segments being disposed on opposite sides of and engaging said tubular housing, whereby said ribs and said housing form said airfoil shape in cross section.

3. In combination, a rotor arm for rotation about an axis, said rotor arm extending generally radially outwardly from said axis, said rotor arm being divided into a body portion and a detachable tip portion, said body portion including a tubular spar extending generally radially and outwardly with respect to the rotational axis, said tubular spar having an end portion forming a housing adjacent said tip portion, and an engine disposed within said housing, whereby upon detachment of said tip portion access is had to said engine and said housing, said tubular housing having an abutment for preventing movement of said engine in one direction, said tip portion having a second abutment for preventing movement of said engine in the direction opposite the first-mentioned direction, and said engine being slidably movable relative to said housing.

4. In combination, a helicopter rotor arm having a detachably mounted tip portion, said rotor arm having an airfoil shape in cross section and including a tubular spar extending longitudinally within said rotor arm, said tubular spar having an end portion adjacent said tip portion defining a housing, a plurality of ribs extending transversely of said tubular spar, said ribs being each divided into two segments, said segments being rigidly secured to opposite sides of said tubular spar and defining therewith said airfoil shape, an engine having a tubular casing disposed within said housing, a plurality of first runners rigidly secured to said housing, and a plurality of second runners rigidly secured to said engine casing, said second runners cooperating with said first runners and providing for slidable movement of said engine relative to said housing, whereby upon detachment of the tip portion, said engine may be removed from said housing.

5. In combination, a rotor arm divided into a longitudinally extending body portion and a detachable tip portion, and a jet engine for propelling said rotor, said rotor arm including a spar extending longitudinally within said body portion, said spar having an enlarged tubular end portion adjacent the tip portion forming a housing for said engine, said engine being slidably received in said housing, said housing having an abutment for preventing movement of said engine in one direction, said tip portion having a second abutment for preventing movement of said engine in the direction opposite the first-mentioned direction, said engine being slidably removable with respect to said housing upon detachment of said tip portion, a first conduit providing an inlet for said engine, and a second conduit providing an exhaust for said engine, one of said conduits being disposed in said tip portion.

References Cited in the file of this patent

UNITED STATES PATENTS

| | | |
|---|---|---|
| 1,836,319 | Gehrung | Dec. 15, 1931 |
| 2,464,651 | Pecker | Mar. 15, 1949 |
| 2,474,359 | Isacco | June 28, 1949 |
| 2,485,502 | McCollum | Oct. 18, 1949 |

FOREIGN PATENTS

| | | |
|---|---|---|
| 744,473 | Great Britain | Feb. 8, 1956 |